Patented June 18, 1929.

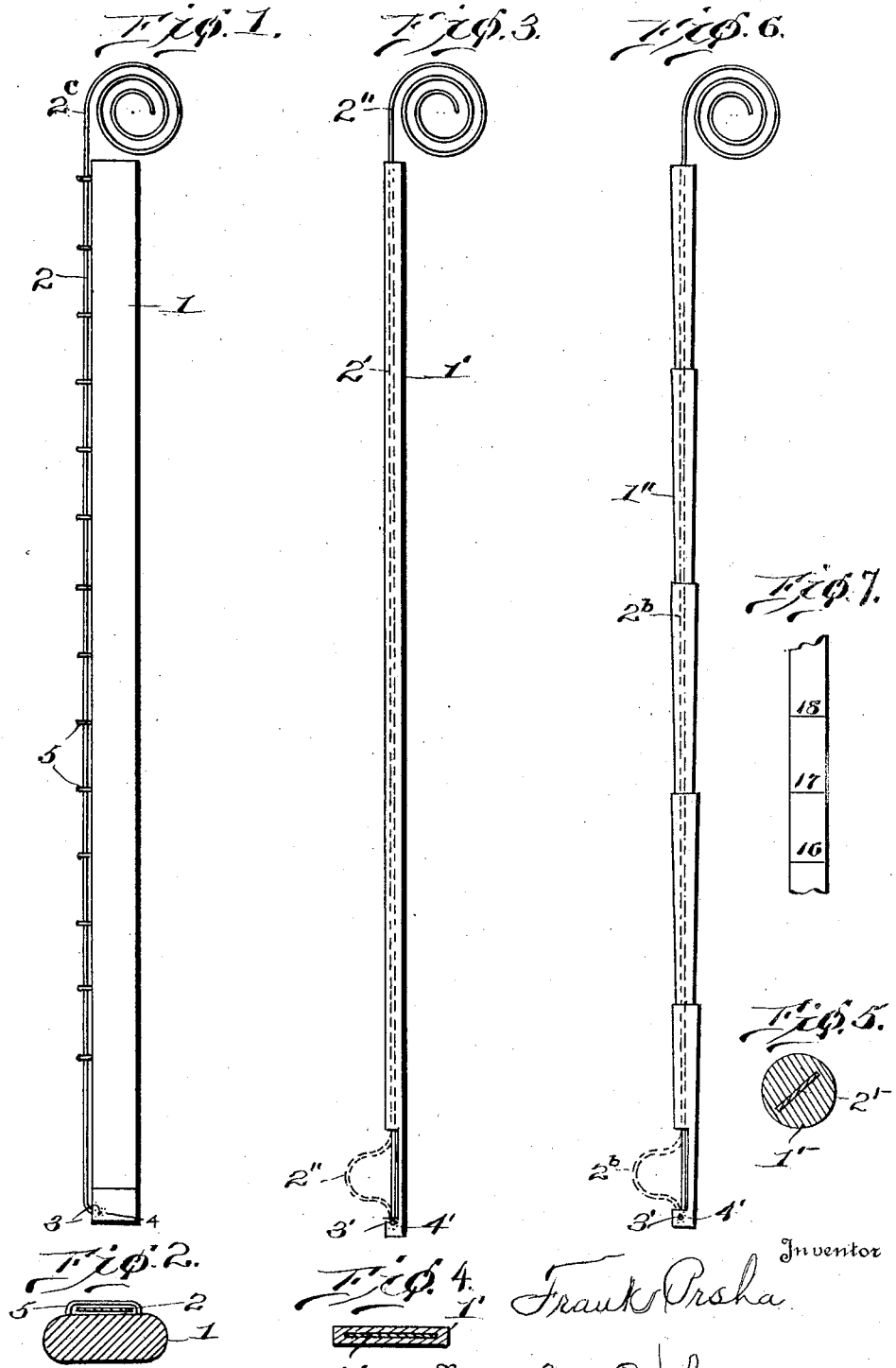

1,718,003

UNITED STATES PATENT OFFICE.

FRANK PRSHA, OF TACOMA, WASHINGTON.

MEASURING INSTRUMENT.

Application filed January 12, 1926. Serial No. 80,779.

This invention relates to measuring instruments, and more especially to that type sometimes called a "loading stick" used for gauging the extent of subterranean cavities.

The primary object of the invention is to provide an instrument capable of indicating the dimensions of a pocket that has been made to receive a charge of explosive material for blasting purposes.

With this object in view, the instrument includes a solid or hollow rod, and a tape or other suitable elongated resilient member disposed longitudinally on or in the rod and fastened at one end to one end of the rod in such manner as to prevent longitudinal movement of the tape at that place. The other end portion of the tape extends freely beyond the other end of the rod. When the rod is solid, the tape is disposed through aligned guides secured to the rod, and the guides may be in the form of staples; and, when the rod is hollow, the tape may be located therein. In both forms, the tape is guided throughout the greater length of the rod.

In order that the tape may be left free to bulge or protrude laterally from the rod for an appreciable distance from its attached end when it is moved along the rod in one direction, the guides are omitted from the lower end portion of the solid rod, or the wall of one side of the hollow rod is cut away at that end. The tape has thereon a scale of graduated lines and characters positioned to indicate at the upper end of the rod the amount of protrusion and thus show the size of the pocket. The tape or other suitable elongated member is substantially non-stretchable, and it is resilient in the sense that it is sufficiently stiff to be moved along the guiding portion of the rod without bending and to bulge or protrude in arcuate form at the lower end of the rod.

In order to facilitate the carrying of the instrument, the rod may be formed of interfitting sections.

In the drawings, Figure 1 is a side elevation of the device in which a solid rod is employed; Figure 2 is a cross-sectional view of the same; Figure 3 is a side view of the device showing a flat hollow rod for carrying the tape; Figure 4 is a cross-section of Figure 3; Figure 5 is a cross-section of a modification in which the tube is round; Figure 6 is a modification, showing a rod of interfitting sections; and Figure 7 is a detail showing the tape marked with figures for noting measurements.

The numeral 1 designates the rod, 2 the resilient tape, 3 a pin or rivet, 4 the fastened terminal of the tape, 5 guides on the rod 1 for guiding the tape, and $2^c$ the free end of 2.

In the work of excavation, as a preliminary to putting down a charge of explosive material, it is customary to first "blow" a pocket at the bottom of a drill-hole with a small quantity of powder, and to put the main charge of explosive down in the pocket so formed. It is extremely important that the powder man should be able to estimate the capacity of this pocket so that the requisite amount of dynamite shall be used. Heretofore, this has been almost entirely a matter of conjecture.

With my invention it is possible to quite accurately measure the depth, height and diameter of such a pocket. This is done by dropping the instrument into the drill-hole, in the position shown in the drawings, and by feeding the slack tape downward through guides 5 or through the rod 1'. This causes the tape 2 to bulge convexly away from said rod at the bottom of the hole thereby forming a loop which extends outwardly until it contacts with the wall of said pocket, as shown at $2''$ and $2^b$ respectively in Figures 3 and 6. The formation of the loop is rendered possible because of the omission of guides near the lower extremity of the solid rod or of the removal of a section of the wall of the hollow rod at a corresponding location on the latter. The scale is read where it leaves the rod at the top, and the device is then raised as far as the roof of the pocket, and the scale again noted in order to learn the vertical extent of the pocket. The device is then withdrawn and the tape is fed downwardly thereon or therein to the same point as above indicated, and the loop thus formed shows approximately one-half of the diameter of the pocket, from which its full diameter is readily gauged. This, taken in connection with the vertical measurement of said pocket, gives an accurate knowledge of the dimensions of the same.

What is herein designated as a "tape" may be flat, round or of any other suitable form; and it may be straight, if desired, instead of coiled, and the rod may be extended the necessary distance for supporting or housing it. The rods herein shown are mainly for illustrative purposes, to show the simplest forms of construction; but the rod may be flexible and of any suitable material; and still other variations may be employed, without departing from the spirit of my invention.

I claim:

1. In a measuring-instrument, a resilient graduated tape, and an elongated substantially rigid rod, one end of said tape being fastened to the corresponding end of said rod whereby to prevent longitudinal movement of the tape at that place, the tape being longer than said rod and the latter being adapted for movably confining a corresponding length of the tape in parallelism with the rod except throughout a limited portion of the length of the rod, at which portion the tape is adapted to be forced outwardly from the rod in the form of a loop, the extent of the loop being determinable by reading the graduation of the protruding end portion of the tape which registers with the adjacent free face of the member.

2. In a measuring instrument, an elongated hollow rod provided with a cut-away portion near one end, a resilient measuring-tape passed longitudinally through said rod and pivotally attached thereto at the terminus of said cutout portion, said tape capable of being fed through said rod and to protrude laterally through said cut-out opening, and the extent of such protrusion being readable upon the scale of said measuring-tape at or near its opposite end.

3. In a measuring instrument, an elongated hollow rod provided with a cut-out opening therein near one end, a resilient measuring-tape passing longitudinally through said rod and pivotally attached thereto near one end of said opening, said tape being capable of being fed through said rod and of extruding through said cut-out opening, the extent of such extrusion being readable upon said tape, and said rod being in sections adapted to be optionally connected and disconnected from one another.

4. In a measuring instrument, an elongated hollow rod provided with a cut-out opening near one end, a resilient measuring-tape passing longitudinally through said rod and pivotally attached thereto near the terminus of said opening, said tape adapted to be fed through said rod and of extruding a portion of its body through said opening, the extent of such extrusion being readable upon said tape, and said rod being in sections adapted to be telescopically slidable within each other so as to be optionally collapsible.

In testimony whereof I have hereto affixed my signature.

FRANK PRSHA